US008685592B2

(12) United States Patent
Kim et al.

(10) Patent No.: US 8,685,592 B2
(45) Date of Patent: Apr. 1, 2014

(54) INORGANIC PROTON CONDUCTOR FOR AN ELECTROCHEMICAL DEVICE AND METHOD OF PREPARING THE INORGANIC PROTON CONDUCTOR

(75) Inventors: Tae-young Kim, Seoul (KR); Pil-won Heo, Yongin-si (KR); Sang-kyun Kang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 209 days.

(21) Appl. No.: 12/834,257

(22) Filed: Jul. 12, 2010

(65) Prior Publication Data
US 2011/0086290 A1    Apr. 14, 2011

(30) Foreign Application Priority Data
Oct. 9, 2009    (KR) .................. 10-2009-0096397

(51) Int. Cl.
*H01M 8/10* (2006.01)
*H01M 8/12* (2006.01)
*H01M 4/13* (2010.01)
*H01M 4/58* (2010.01)
*H01M 6/18* (2006.01)
*H01M 10/0562* (2010.01)
*H01M 4/36* (2006.01)
*H01M 10/16* (2006.01)
*B22F 1/00* (2006.01)
*B22F 3/00* (2006.01)

(52) U.S. Cl.
USPC ........ 429/496; 429/218.1; 429/304; 429/479; 429/480; 429/484; 429/208; 75/228

(58) Field of Classification Search
USPC .............. 429/479, 480, 484, 496, 304, 218.1, 429/208; 75/228
See application file for complete search history.

(56) References Cited

U.S. PATENT DOCUMENTS

| 2005/0221143 A1 | 10/2005 | Kwon et al. |
| 2006/0134507 A1 | 6/2006 | Park et al. |
| 2009/0117436 A1 | 5/2009 | Choi et al. |

FOREIGN PATENT DOCUMENTS

| JP | 2008-053224 | 3/2008 |
| JP | 2008-053225 | 3/2008 |
| JP | 2008/218408 | 9/2008 |
| JP | 2009-110716 | 5/2009 |
| JP | 2009-158131 | 7/2009 |
| KR | 10-2008-0013101 | 2/2008 |

OTHER PUBLICATIONS

Attidekou et al. Journal of the Electrochemical Society vol. 154 No. 3 pp. A217-A220 2007.*
Nagao, Masahiro, et al., "Proton Conduction in $In^{3+}$-Doped $SNP^2O^7$ at Intermediate Temperatures", *Journal of the Electrochemical Society*, 153 (8), (2006) pp. A1604-A1609.

(Continued)

*Primary Examiner* — Patrick Ryan
*Assistant Examiner* — Aaron Greso
(74) *Attorney, Agent, or Firm* — Stein IP, LLC

(57) ABSTRACT

An inorganic proton conductor for an electrochemical device and an electrochemical device using the inorganic proton conductor, the inorganic proton conductor including a tetravalent metallic element and an alkali metal.

16 Claims, 5 Drawing Sheets

(56) References Cited

OTHER PUBLICATIONS

U.S. Appl. No. 13/081,667, filed Apr. 7, 2011, Tae-young Kim et al., Samsung Electronics Co., Ltd.

European Search Report issued Feb. 14, 2011, in European Patent Application No. 10175484.4.

Yaroslavtsev et al.: "Modification of solid state proton conductors" Solid State Ionics, vol. 176, No. 39-40, Dec. 1, 2005, pp. 2935-2940.

M. Nagao et al.: "A Proton-Conducting $In^{3+}$-Doped $SnP_2O_7$ Electrolyte for Intermediate-Temperature Fuel Cells" Electrochemical and Solid-State Letters, vol. 9, No. 3, Jan. 12, 2006, pp. A105-A109.

K. Genzaki et al.: "Proton Conductivity and Solid Acidity of Mg-, In- and Al-Doped $SnP_2O_7$" Journal of the Electrochemical Society, vol. 156, No. 7, May 6, 2009, pp. B806-B810.

M. Nagano et al.: "Proton Conduction in $In^{3+}$-Doped $SnP_2O_7$ at Intermediate Temperatures" Journal of the Electrochemical Society, vol. 153, No. 8, Jun. 15, 2006, pp. A1604-A1609.

\* cited by examiner

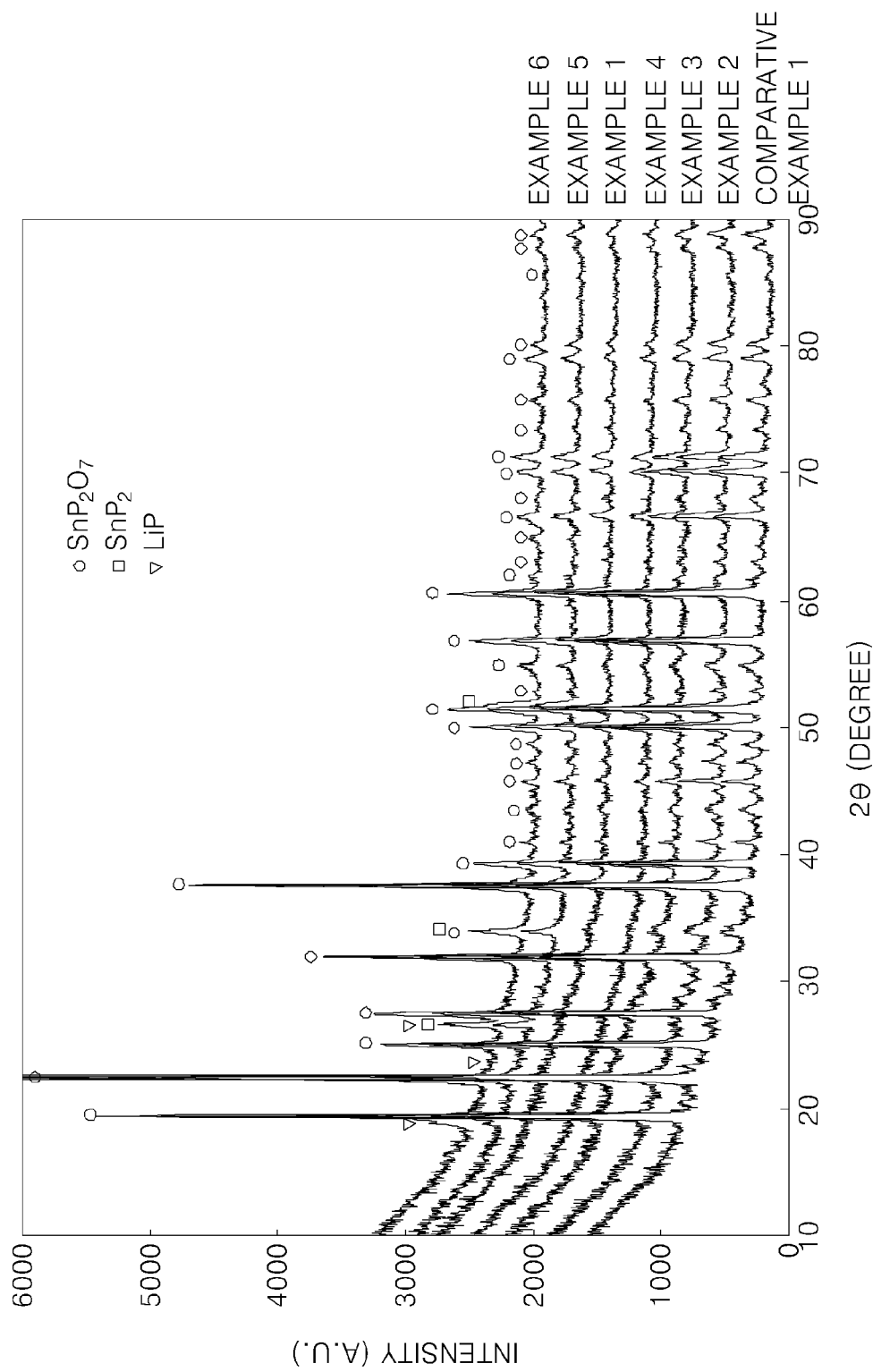

INORGANIC PROTON CONDUCTOR FOR AN ELECTROCHEMICAL DEVICE AND METHOD OF PREPARING THE INORGANIC PROTON CONDUCTOR

CROSS-REFERENCE TO RELATED APPLICATION

This application claims the benefit of Korean Patent Application No. 10-2009-0096397, filed Oct. 9, 2009, in the Korean Intellectual Property Office, the disclosure of which is incorporated herein, by reference.

BACKGROUND

1. Field

The present disclosure relates to inorganic proton conductors and methods of preparing the same.

2. Description of the Related Art

Fuel cells are categorized according to the type of electrolyte and fuel used therein, and can be classified into polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs). In addition, the operating temperature and materials of components of fuel cells vary according to the type of electrolyte used therein.

SOFCs operate at a high temperature of between about 800 to about 1000° C., and are known to be suitable for use in decentralized power supplies. In particular, SOFCs have high electrical efficiency and can be operated using a variety of fuels, including lower purity gaseous fuels. However, due to the high temperature operation, it is expensive to maintain the durability of SOFCs in a high temperature environment, and fast on-off performance is impossible. In this sense, SOFCs are not suitable for various applications, such as for portable power supplies and for automobiles. Therefore, research on operating SOFCs at a low temperature has been actively conducted.

In PEMFCs, an electrolyte membrane is a polymer membrane that needs humidification, and thus, the conductivity of such fuel cells dramatically decreases, at a temperature of 100° C. or greater. In addition, to maintain humidified conditions, PEMFCs include a humidifier that should be carefully controlled, according to operating conditions.

As described above, as research into operating PEMFCs at high temperatures and operating SOFCs at low temperatures has been actively conducted, fuel cells capable of operating at a temperature between about 150 to about 400° C. have drawn much attention. However, electrolytes having ionic conductivity in this temperature range are not known.

SUMMARY

Provided are inorganic proton conductors having excellent proton conductivity and methods of preparing the same.

According to an aspect of the present invention, there is provided an inorganic proton conductor represented by Formula 1 below:

　　　　　　　　　　　　　　　　　　<Formula 1>

In Formula 1, M comprises a tetravalent metallic element, N comprises an alkali metal, and "a" is a number in the range of 0.01 to 0.7.

According to another aspect of the present invention, a method of preparing an inorganic proton conductor represented by Formula 1 includes: adding a solvent to a mixture of a tetravalent metallic element (M) precursor, an alkali metal (N) precursor and phosphoric acid to prepare a composition for forming the inorganic proton conductor of Formula 1; stirring the composition; and heat treating the resultant composition, Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIG. 2 is a graph showing X-ray diffraction analysis results of inorganic proton conductors prepared in Examples 1 through 6 and Comparative Example 1;

DETAILED DESCRIPTION

Figure 1A:
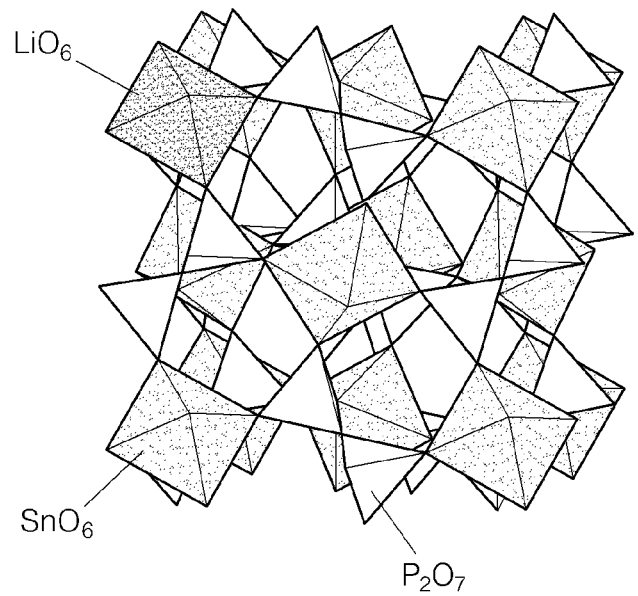
FIG. 1A is a diagram illustrating a crystalline structure of an inorganic proton conductor, $Sn_{1-a}Li_aP_2O_7$, according to an embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

According to an exemplary embodiment of the present invention, there is provided an inorganic proton conductor represented by Formula 1 below:

　　　　　　　　　　　　　　　　　　<Formula 1>

In Formula 1, M is a tetravalent metallic element, N is an alkali metal, and a is a number in the range of 0.01 to 0.7. M is a metallic element forming a tetravalent cation, and may be, for example, one selected from the group consisting of tin (Sn), zirconium (Zr), tungsten (W), silicon (Si), molybdenum (Mo), and titanium (Ti). N may be one selected from the group consisting of lithium (Li), sodium (Na), potassium (K), and cesium (Cs).

The inorganic proton conductor of Formula 1 has a structure in which M, when forming a tetravalent cation, is partially substituted with N, an alkali metal. In Formula 1, a is a number in the range of 0.05 to 0.5, for example, a number in the range of 0.1 to 0.4. M may be Sn, and N may be Li, according to some aspects. Thus, for example, Formula 1 may be represented as $Sn_{1-a}Li_aP_2O_7$.

Figure 1B:
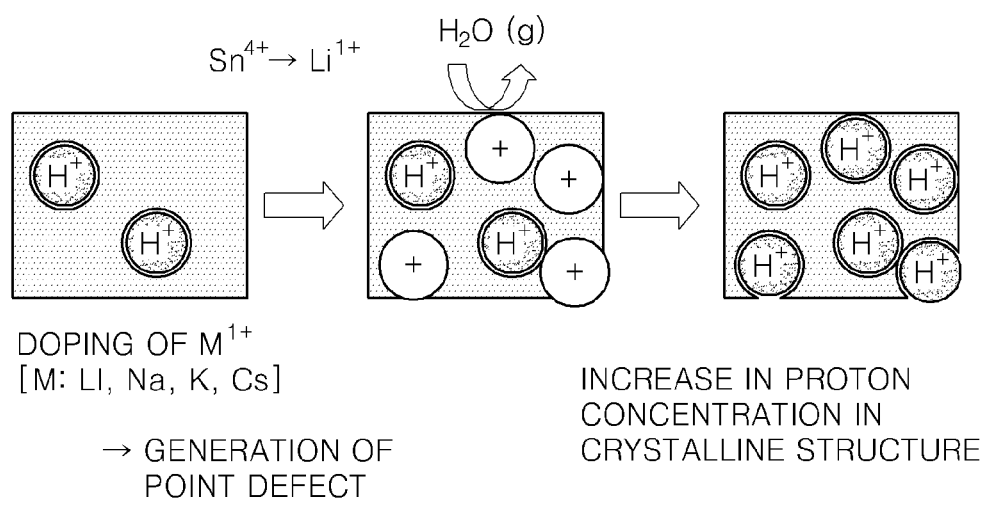
FIG. 1B is a diagram for explaining a principle whereby proton concentration increases in the crystalline structure of FIG. 1A, according to an embodiment of the present invention.

FIG. 1A is a diagram illustrating the crystalline structure of $Sn_{1-a}Li_aP_2O_7$, according to an exemplary embodiment of the present invention. FIG. 1B is a diagram for explaining a principle whereby the proton concentration increases in the crystalline structure of FIG. 1A, according to an exemplary embodiment of the present invention.

Referring to FIGS. 1A and 1B, $Sn_{1-a}Li_aP_2O_7$ has a structure in which $Sn^{4+}$ ions of $SnP_2O_7$ (tin phosphate) are partially substituted (doped) with alkali metal ions. While the alkali metal ions are shown as being Li+, according to some aspects, the alkali metal ions may also be Na+, K+, or Cs+. The alkali metal ions, which are monovalent metal ions, are doped to generate point defects in the crystalline structure of the tin phosphate. Thus, the proton concentration the doped resultant ($Sn_{1-a}Li_aP_2O_7$) is higher than that of the undoped tin phosphate. In addition, the alkali metal dopant increases the binding affinity of the doped resultant with phosphoric acid. Thus, the inorganic proton conductor exhibits excellent conduction properties at high temperatures.

$Sn_{1-a}Li_aP_2O_7$, where "a" is a number in the range of 0.1 to 0.3, has a main phase crystalline structure, as shown by X-ray diffraction analysis. $Sn_{1-a}Li_aP_2O_7$, where "a" is a number in the range of 0.4 to 0.5, has a different phase, in which lithium exceeds the solid solubility limit, that is, a secondary phase of lithium.

The inorganic proton conductor of Formula 1 may be, for example, $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$.

The inorganic proton conductor of Formula 1 may be prepared as follows. First, a tetravalent metallic element M precursor, an alkali metal N precursor, and phosphoric acid are mixed, and a solvent is added thereto. The resultant is mixed to prepare a composition to form the inorganic proton conductor of Formula 1.

The solvent may be deionized water, methanol, ethanol, or isopropyl alcohol, for example. The amount of the solvent may be in the range of about 300 to about 800 parts by weight, based on 100 parts by weight of the M precursor. When the amount of the solvent is within this range, the viscosity of the composition is appropriate, and thus, the composition can be handled easily.

The composition is stirred at a temperature in the range of about 200 to about 300° C. When the stirring process is performed within this temperature range, the constituent components of the composition are uniformly mixed, and water is removed from the composition, so that the viscosity of the composition is maintained appropriately. When the viscosity of the composition is adjusted as described above, a subsequent heat treatment process may be efficiently performed, without the composition undergoing a phase separation.

Subsequently, the composition is heat-treated at a temperature in a range of about 300 to about 1,200° C. The resultant is pulverized into powder having a predetermined particle size, thereby completing the preparation of the inorganic proton conductor of Formula 1.

The M precursor may be an M oxide, an M chloride, or an M hydroxide, for example. In particular, the M precursor may include at least one selected from the group consisting of tin oxide ($SnO_2$), tin chloride ($SnCl_4$, $SnCl_2$), tin hydroxide ($Sn(OH)_4$), tungsten oxide ($WO_2$, $WO_3$), tungsten chloride ($WCl_4$), molybdenum oxide ($MoO_2$), molybdenum chloride ($MoCl_3$), zirconium oxide ($ZrO_2$), zirconium chloride ($ZrCl_4$), zirconium hydroxide ($Zr(OH)_4$), titanium oxide ($TiO_2$), and titanium chloride ($TiCl_2$, $TiCl_3$).

The N precursor may be an N oxide, an N chloride, an N hydroxide, or an N nitrate, for example. In particular, the N precursor may include at least one selected from the group consisting of lithium hydroxide ($LiOH \cdot H_2O$), lithium oxide ($Li_2O$), lithium chloride (LiCl), lithium nitrate ($LiNO_3$), sodium hydroxide (NaOH), sodium chloride (NaCl), potassium hydroxide (KOH), potassium chloride (KCl), cesium hydroxide ($CsOH \cdot H_2O$), and cesium chloride (CsCl).

The amount of the N precursor may be in the range of about 5 to about 50 mol %, based on the total amount of the M precursor and the N precursor. When the amount of the N precursor is within this range, the inorganic proton conductor of Formula 1 is obtained.

80 to 100 wt % of an aqueous phosphoric acid solution is used as the phosphoric acid. When 85 wt % of an aqueous phosphoric acid solution is used, the amount of the phosphoric acid may be in the range of about 200 to about 300 parts by weight, based on 100 parts by weight of the M precursor. When the amount of the phosphoric acid is within this range, the desired inorganic proton conductor of Formula 1 may easily be obtained, taking into consideration the loss of phosphoric acid during the heat treatment process.

When the heat treatment temperature of the composition is within this range, the inorganic proton conductor of Formula 1, having excellent proton conductivity, may be obtained substantially without structural changes. The heat treatment time varies according to the heat treatment temperature; but may be in the range of about 1 to about 5 hours. The heat treatment process may be performed in an inert gas atmosphere, such as a nitrogen atmosphere. The heat treatment may also be performed in an air atmosphere. In the process of pulverizing to powder, the average particle diameter obtained is not particularly limited. For example, the powder may be pulverized so as to have an average particle diameter of about 50 to about 5,000 nm.

The inorganic proton conductor of Formula 1 may be $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$, for example. The inorganic proton conductor of Formula 1 may be used in fuel cells including electrodes and an electrolyte. The inorganic proton conductor of Formula 1 may be used in electrochemical devices, such as hydrogen generators and exhaust gas purifying apparatuses.

The inorganic proton conductor may be a non-humidified type proton conductor, and may be used in fuel cells that operate at a moderate temperature, in non-humidified conditions. The term "moderate temperature" refers to a temperature in the range of about 150 to about 400° C.; however, the moderate temperature is not particularly limited.

One or more exemplary embodiments of the present invention will be described in further detail with reference to the following examples. These examples are for illustrative purposes only and are not intended to limit the scope of the present invention.

EXAMPLE 1

$SnO_2$, $LiOH \cdot H_2O$, and 85 wt % of $H_3PO_4$ were mixed together, in a molar ratio of Sn:Li:P of 0.7:0.3:2-3. De-ionized (ion exchange) water was added to the mixture, and the resultant was stirred at about 250° C., to prepare a mixed paste having a high viscosity. The amount of LiOH.H$_2$O was 30 mol %, and the amount of SnO$_2$ was 70 mol %. The mixed paste was heat treated in an alumina crucible at 650° C., for 2.5 hours, thereby forming a lump of the paste.

The lump obtained after the heat treatment was pulverized with a mortar, to prepare a milk-white powder of Sn$_{0.7}$Li$_{0.3}$P$_2$O$_7$. The composition of the Sn$_{0.7}$Li$_{0.3}$P$_2$O$_7$ was confirmed by Ion Coupled Plasma (ICP) atomic emission spectrometry (ICP-AES). In consideration of the partial loss of phosphoric acid during the heat treatment process, an initial amount of phosphoric acid added to the inorganic proton conductor was determined to have a final stoichiometric composition of Sn$_{0.7}$Li$_{0.3}$P$_2$O$_7$ (Sn:Li:P=0.7:0.3:2).

EXAMPLE 2

Sn$_{0.95}$Li$_{0.05}$P$_2$O$_7$ was prepared in the same manner as in Example 1, except that 5 mol % of LiOH.H$_2$O was used, to achieve a molar ratio of Sn:Li:P of 0.95:0.05:2-3.

EXAMPLE 3

Sn$_{0.9}$Li$_{0.1}$P$_2$O$_7$ was prepared in the same manner as in Example 1, except that 10 mol % of LiOH.H$_2$O was used, to achieve a molar ratio of Sn:Li:P of 0.9:0.1:2-3.

EXAMPLE 4

Sn$_{0.8}$Li$_{0.2}$P$_2$O$_7$ was prepared in the same manner as in Example 1, except that 20 mol % of LiOH.H$_2$O was used, to achieve a molar ratio of Sn:Li:P of 0.8:0.2:2-3.

EXAMPLE 5

Sn$_{0.6}$Li$_{0.4}$P$_2$O$_7$ was prepared in the same manner as in Example 1, except that 40 mol % of LiOH.H$_2$O was used, to achieve a molar ratio of Sn:Li:P of 0.6:0.4:2-3.

EXAMPLE 6

Sn$_{0.5}$Li$_{0.5}$P$_2$O$_7$ was prepared in the same manner as in Example 1, except that 50 mol % of LiOH.H$_2$O was used, to achieve a molar ratio of Sn:Li:P of 0.5:0.5:2-3.

EXAMPLE 7

Sn$_{0.7}$Na$_{0.3}$P$_2$O$_7$ was prepared in the same manner as in Example 1, except that NaOH was used instead of LiOH.H$_2$O.

EXAMPLE 8

Sn$_{0.7}$K$_{0.3}$P$_2$O$_7$ was prepared in the same manner as in Example 1, except that KOH was used instead of LiOH.H$_2$O.

EXAMPLE 9

Sn$_{0.7}$Cs$_{0.3}$P$_2$O$_7$ was prepared in the same manner as in Example 1, except that CsOH was used instead of LiOH.H$_2$O.

EXAMPLE 10

Zr$_{0.9}$Li$_{0.1}$P$_2$O$_7$ was prepared in the same manner as in Example 1, except that ZrO$_2$ was used instead of SnO$_2$, and ZrO$_2$, LiOH.H$_2$O, and 85 wt % of H$_3$PO$_4$ were mixed in a molar ratio of Zr:Li:P of 0.9:0.1:2-3.

EXAMPLE 11

Ti$_{0.9}$Li$_{0.1}$P$_2$O$_7$ was prepared in the same manner as in Example 10, except that TiO$_2$ was used instead of SnO$_2$.

EXAMPLE 12

Si$_{0.9}$Li$_{0.1}$P$_2$O$_7$ was prepared in the same manner as in Example 10, except that SiO$_2$ was used instead of SnO$_2$.

EXAMPLE 13

Mo$_{0.9}$Li$_{0.1}$P$_2$O$_7$ was prepared in the same manner as in Example 10, except that MoO$_2$ was used instead of SnO$_2$.

EXAMPLE 14

W$_{0.9}$Li$_{0.1}$P$_2$O$_7$ was prepared in the same manner as in Example 10, except that WO$_3$ was used instead of SnO$_2$.

COMPARATIVE EXAMPLE 1

SnP$_2$O$_7$ was prepared in the same manner as in Example 1, except that SnO$_2$ and 85 wt % of H$_3$PO$_4$ were mixed in a molar ratio of Sn:P of 1:2-3.

COMPARATIVE EXAMPLE 2

Sn$_{0.9}$In$_{0.1}$P$_2$O$_7$ was prepared in the same manner as in Example 1, except that In$_2$O$_3$ was used instead of LiOH.H$_2$O, and SnO$_2$, In$_2$O$_3$, and 85 wt % of H$_3$PO$_4$ were mixed in a molar ratio of Sn:In:P of 0.9:0.1:2-3.

The inorganic proton conductors prepared in Examples 1 through 6 and Comparative Example 1 were respectively pulverized with a mortar, and an X-ray diffraction analysis was performed on each material, to observe changes in the XRD peaks of the materials. The changes in XRD peaks are shown in FIG. 2. Referring to FIG. 2, the inorganic proton conductors including LiOH in an amount of 40 mol % or greater have a secondary phase. From this result, it can be seen that the solid solubility limit of Li is 30 mol %.

Figure 3:
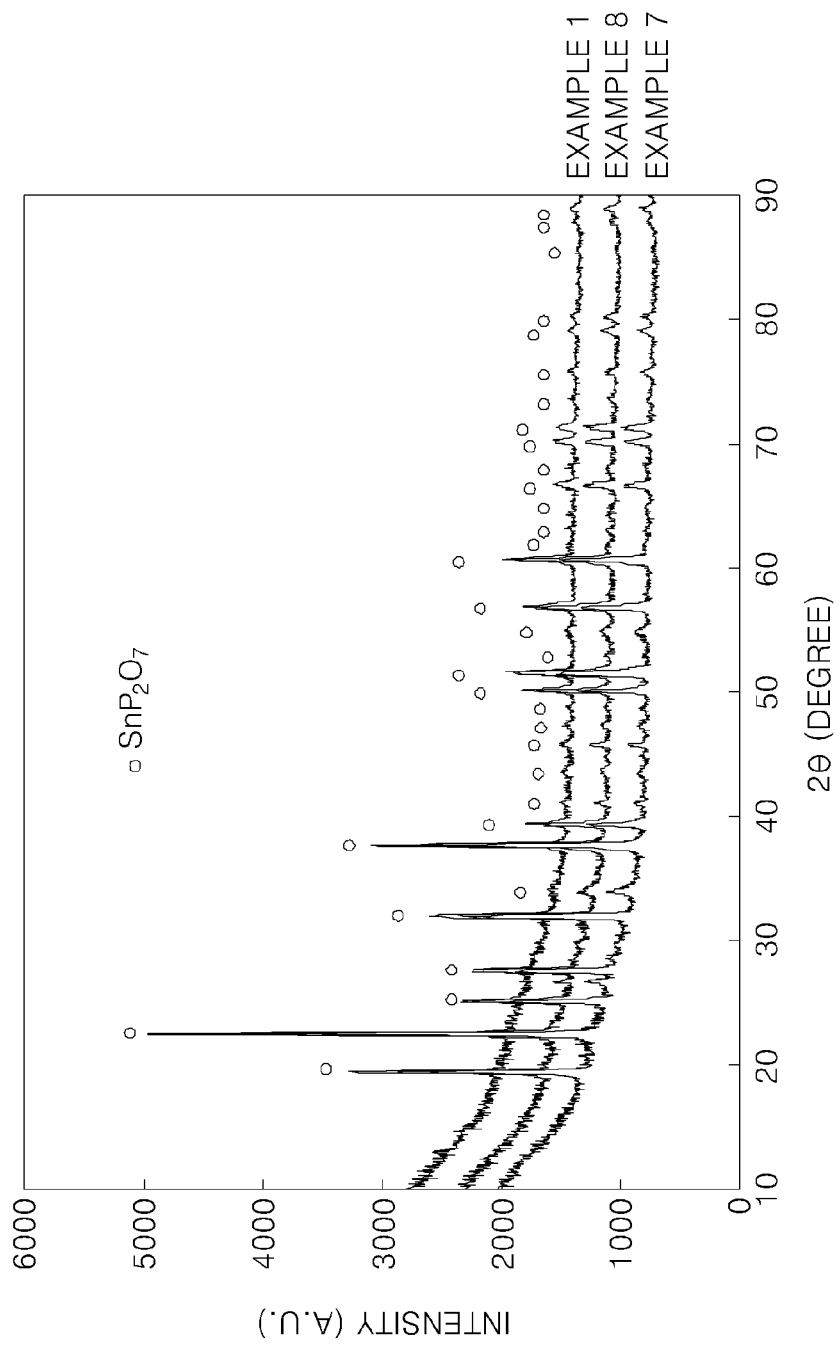
FIG. 3 is a graph showing X-ray diffraction analysis results of inorganic proton conductors prepared in Examples 1, 7, and 8.

The inorganic proton conductors prepared in Examples 1, 7, and 8 were respectively pulverized with a mortar, and X-ray diffraction analysis was then performed on each of the materials. FIG. 3 is a graph showing X-ray diffraction analysis results of inorganic proton conductors prepared in Examples 1, 7, and 8. Referring to FIG. 3, it can be seen that the inorganic proton conductors have the crystalline structure of SnP$_2$O$_7$.

Figure 4:
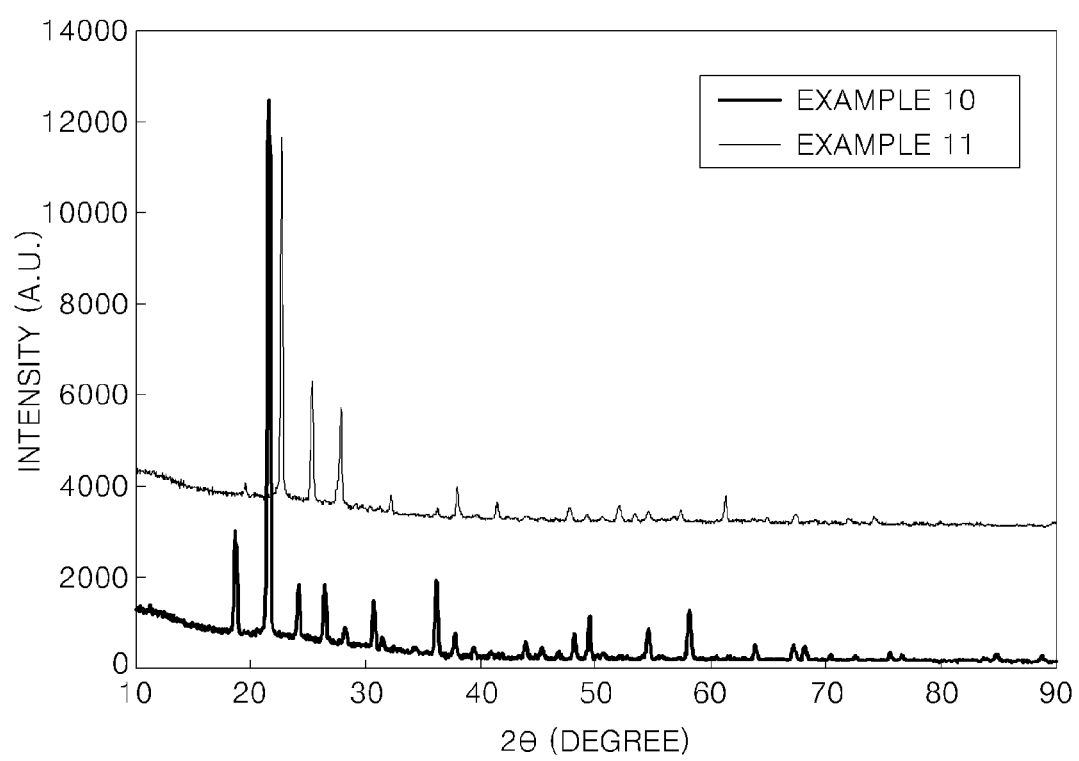
FIG. 4 is a graph showing X-ray diffraction analysis results of inorganic proton conductors prepared in Examples 10 and 11.

The inorganic proton conductors prepared in Examples 10 and 11 were respectively pulverized with a mortar, and an X-ray diffraction analysis was then performed on each of the materials, to observe a change in the XRD peaks of the materials (Refer to FIG. 4). Referring to FIG. 4, it can be seen that the inorganic proton conductors maintained the crystalline structure of SnP$_2$O$_7$.

A change in proton conductivity according to temperature, of each of the inorganic proton conductors prepared in Examples 1, 3, 4 and 5, and SnP$_2$O$_7$ prepared in Comparative Example 1, was measured. The inorganic proton conductors prepared in Examples 1 and 3 through 6, and Comparative Examples 1 and 2 were respectively pulverized with a mortar. Each of the resultants was pressurized at 3×10$^3$ kg/cm$^2$, to prepare a pellet having a diameter of 12 mm. Each pellet was pressed between blocking electrodes coated with gold, to prepare a conductivity measuring cell. Each conductivity measuring cell was put in an oven, and the proton conductivity thereof was measured using a four-electrode AC impedance method, in a non-humidified air atmosphere, under varying temperature conditions, at a frequency of 0.1-1×10^6 Hz, and an amplitude of 20 mV.

Figure 5:
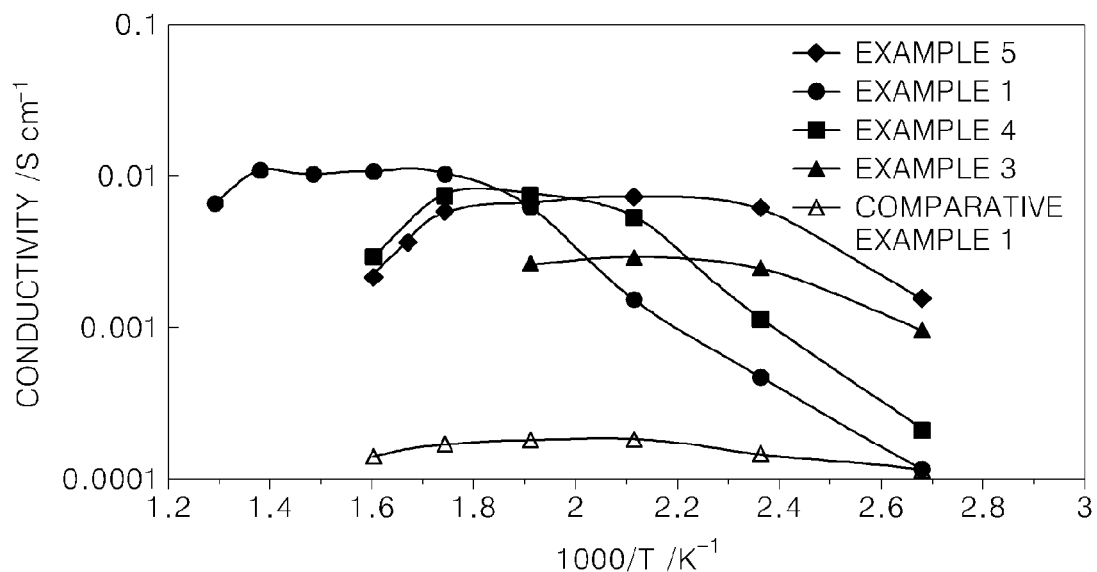
FIG. 5 is a graph showing a change in conductivity according to temperature of inorganic proton conductors prepared in Examples 1, 3, 4, and 5, and $SnP_2O_7$ prepared in Comparative Example 1.

The results of the changes in proton conductivity are shown in FIG. 5. Referring to FIG. 5, it can be seen that the inorganic proton conductors of Examples 1, 3, 4, and 5 have a higher conductivities than the $SnP_2O_7$ of Comparative Example 1.

Figure 6:
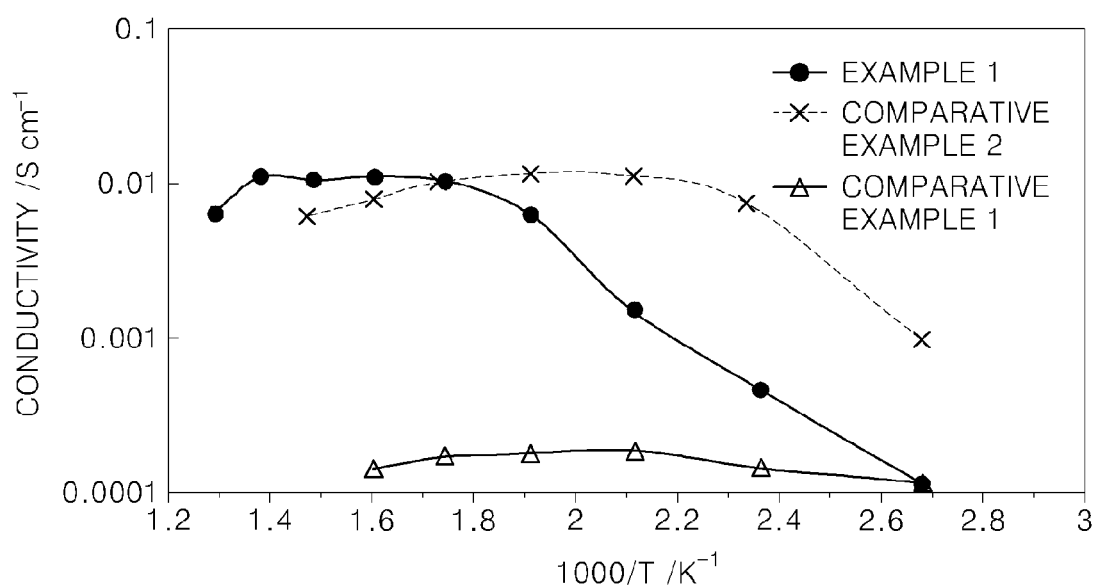
FIG. 6 is a graph showing the conductive properties of inorganic proton conductors prepared in Example 1 and Comparative Examples 1 and 2.

The conductive properties of the inorganic proton conductors prepared in Example 1 and Comparative Examples 1 and 2 were measured, and the results are shown in FIG. 6. The measurement of the conductive properties thereof was conducted in the same manner as described above for the organic proton conductors of Examples 1, 3, 4, and 5, and Comparative Examples 1-2.

Referring to FIG. 6, the inorganic proton conductor of Example 1 has a higher proton conductivity than that of the inorganic proton conductor of Comparative Example 1. In addition, the inorganic proton conductor of Example 1 has a maximum conductivity value similar to that of the $Sn_{0.9}In_{0.1}P_2O_7$ of Comparative Example 2. However, a temperature having the maximum conductivity of the inorganic proton conductor of Example 1 has maximum conductivity at a higher temperature than that of Comparative Example 2.

As described above, according to the one or more of the above exemplary embodiments of the present invention, there is provided an inorganic proton conductor having excellent proton conductivity, in a wide temperature range.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An inorganic proton conductor for an electrochemical device, with the inorganic proton conductor being represented by Formula 1:

wherein,
M comprises a tetravalent metallic element,
N comprises an alkali metal, and
$0.01 \leq a \leq 0.7$.

2. The inorganic proton conductor of claim 1, wherein in Formula 1, a is a number in the range of 0.05 to 0.5.

3. The inorganic proton conductor of claim 1, wherein the proton conductor is one selected from the group consisting of $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$.

4. A method of preparing the crystalline inorganic proton conductor of claim 1, the method comprising:
adding a solvent to a mixture of a tin precursor, a lithium precursor, and phosphoric acid, to prepare a composition;
stirring the composition; and
heat treating the stirred composition to form the inorganic proton conductor of Formula 1, $Sn_{1-a}Li_aP_2O_7$, wherein <Formula 1>

$0.01 \leq a \leq 0.7$.

5. The method of claim 4, wherein the stirring is performed at a temperature in the range of about 200° C. to about 300° C.

6. The method of claim 4, wherein the heat treating is performed at a temperature in the range of about 300° C. to about 1,200° C.

7. The method of claim 4, wherein the tin precursor is at least one selected from the group consisting of tin oxide, tin chloride, and tin hydroxide.

8. The method of claim 4, wherein the lithium precursor comprises at least one selected from the group consisting of lithium hydroxide, lithium oxide, lithium chloride, and lithium nitrate.

9. The method of claim 5, wherein the amount of the phosphoric acid is in the range of about 200 to about 300 parts by weight, based on 100 parts by weight of the tin precursor.

10. The method of claim 5, wherein the solvent comprises at least one selected from the group consisting of deionized water, methanol, ethanol, and isopropyl alcohol.

11. A inorganic proton conductor for an electrochemical device, with the inorganic proton conductor being represented by Formula 1:
<Formula 1>

wherein,
M is a tetravalent metallic element selected from the group consisting of tin (Sn), zirconium (Zr), tungsten (W), silicon (Si), molybdenum (Mo), titanium (Ti), and a combination thereof,
N comprises an alkali metal selected from the group consisting of lithium (Li), sodium (Na), potassium (K), cesium (Cs), and a combination thereof, and
$0.01 \leq a \leq 0.7$.

12. The crystalline inorganic proton conductor of claim 11, wherein the proton conductor is selected from the group consisting of $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, and $Sn_{0.5}Li_{0.5}P_2O_7$, and a combination thereof.

13. A method of preparing the crystalline inorganic proton conductor of claim 1, comprising:
adding a solvent to a mixture of a tin precursor, a lithium precursor, and phosphoric acid, to prepare a composition;
stirring the composition at a temperature in the range of about 200° C. to about 300° C.; and
heat treating the stirred composition at a temperature in the range of about 300° C to about 1,200° C., to form the crystalline inorganic proton conductor of Formula 1.

14. The method of claim 13, wherein the M tin precursor is selected from the group consisting of tin oxide, tin chloride, tin hydroxide, and a combination thereof.

15. The method of claim 13, wherein the N lithium precursor is selected from the group consisting of lithium hydroxide, lithium oxide, lithium chloride, lithium nitrate, and a combination thereof.

16. The method of claim 13, wherein the amount of the phosphoric acid is in the range of about 200 to about 300 parts by weight, based on 100 parts by weight of the tin precursor.

* * * * *

UNITED STATES PATENT AND TRADEMARK OFFICE
CERTIFICATE OF CORRECTION

PATENT NO. : 8,685,592 B2  
APPLICATION NO. : 12/834257  
DATED : April 1, 2014  
INVENTOR(S) : Tae-young Kim et al.

Page 1 of 1

It is certified that error appears in the above-identified patent and that said Letters Patent is hereby corrected as shown below:

In the Claims:

In claim 3 (col. 7, line 50), "Sn0.8Li0.2P2O7, Sn0.6Li0.4P2O7." should read -- $Sn_{0.8}Li_{0.2}P_2O_7$, $Sn_{0.6}Li_{0.4}P_2O_7$, and $Sn_{0.5}Li_{0.5}P_2O_7$[,]. --.

In claim 11 (col. 8, line 20), "A inorganic proton contuctor" should read -- A crystalline inorganic proton conductor --.

In claim 11 (col. 8, line 21), "with the inorganic proton" should read -- with the crystalline inorganic proton --.

In claim 11 (col. 8, line 25), "M1-aNaP2O7," should read -- $Sn_{1-a}Li_aP_2O_7$, wherein --.

In claim 11 (col. 8, line 26), "wherein," should read -- wherein --.

In claim 11 (col. 8, lines 27-33), starting at "M is a tetravalent...." to ending at "(Cs), and a combination thereof, and", should be deleted entirely.

Signed and Sealed this  
Sixteenth Day of September, 2014

Michelle K. Lee  
*Deputy Director of the United States Patent and Trademark Office*